United States Patent
Yu et al.

(10) Patent No.: US 6,929,503 B2
(45) Date of Patent: Aug. 16, 2005

(54) MOUNTING STRUCTURE FOR LAMP WIRES OF A BACK LIGHT MODULE

(75) Inventors: Hong-Tien Yu, Pate (TW); Cheng-Min Liao, Chung Li (TW)

(73) Assignee: Chunghwa Picture Tubes, Ltd., Taipei (TW)

(*) Notice: Subject to any disclaimer, the term of this patent is extended or adjusted under 35 U.S.C. 154(b) by 162 days.

(21) Appl. No.: 10/644,505

(22) Filed: Aug. 20, 2003

(65) Prior Publication Data

US 2005/0042913 A1 Feb. 24, 2005

(51) Int. Cl.$^7$ ............................................. H01R 13/58
(52) U.S. Cl. ........................ 439/451; 439/470; 248/73; 362/391
(58) Field of Search ................................. 439/449, 456, 439/942, 470, 451; 362/391, 396; 248/73; 174/74 R, 74 A, 76, 79, 43

(56) References Cited

U.S. PATENT DOCUMENTS 5,769,646 A * 6/1998 Cavello et al. ............ 439/942
6,056,418 A * 5/2000 Hsu ............................ 362/396
2003/0068922 A1 * 4/2003 Yao ............................ 439/502

* cited by examiner

Primary Examiner—P. Austin Bradley
Assistant Examiner—Felix O. Figueroa
(74) Attorney, Agent, or Firm—Thomas, Kayden, Horstemeyer & Risley

(57) ABSTRACT

A mounting structure for lamp wires of a back light module to mount at least two lamp wires extending from a plastic frame. The mounting structure includes a fixed bar portion and a tabling portion connected together by a connecting portion to form a lamp channel therebetween. The connecting portion has a wire-fixing hole to fix one of the lamp wires. The lamp wires are induced into the lamp wire channel. A retaining clamp portion is extended from the tabling portion and overhung the plastic frame. The retaining clamp portion and the tabling portion have a wire clip hole perpendicularly connected to the lamp channel and a clamp opening connected to the wire clip hole to fix the lamp wires in the wire clip hole.

9 Claims, 3 Drawing Sheets

MOUNTING STRUCTURE FOR LAMP WIRES OF A BACK LIGHT MODULE

FIELD OF THE INVENTION

The present invention relates to a Liquid Crystal Display (LCD), and more particularly to a mounting structure for lamp wires of a back light module in a liquid crystal display.

BACKGROUND OF THE INVENTION

User demand for entertainment equipment is particularly high as a result of the rapid development of multimedia applications. Conventionally, the cathode ray tube (CRT) display, which is a type of monitor, is commonly used. However, the cathode ray tube display does not meet the needs of multimedia technology because of the large volume thereof. Therefore, many flat panel display techniques such as liquid crystal display (LCD), plasma display panel (PDP), and field emission display (FED) have been recently developed.

Of these techniques, the liquid crystal display (LCD) is attracting attention in the field of displays as a full-color display. This is because of its capability for high quality display, which, unlike the CRT, is flat. On the other hand, this liquid crystal display apparatus is small in size and lightweight. Therefore, this LCD apparatus can be used in any electrical product that requires a display to show information. For example, the LCD can be used in a calculator, an electrical dictionary, a watch, a mobile phone, a notebook, a communication terminal, a display board and so on to serve as a display to show information.

A conventional back light type LCD comprises a front-end liquid crystal panel and a back-end back light module. Therefore, a large back light module is required for providing enough illumination to pass through the liquid crystal layer to show the information of the LCD. Typically, fluorescent lamps are used as the back light source. The light passes through a back light film to provide uniform illumination of the liquid crystal panel.

The back light film is mounted in a plastic frame for installation with other components in the back light module. A wire channel or a wire hole is built in the typical back light module for the lamp wires to connect with the peripheral circuit. The lamp wires extend from the corner of the plastic frame. However, the lamp wires are either difficult to fix or easy to break because they extend from the corner in the conventional plastic frame.

SUMMARY OF THE INVENTION

It is an object of the present invention to provide a mounting structure for mounting lamp wires in a back light module. This mounting structure can reduce bad products resulting from difficulty in mounting the lamp wires.

It is another object of the present invention to provide a mounting structure for lamp wires of a back light module that provides a user-friendly mounting structure for fixing the lamp wires to increase the yield of the product.

Therefore, the present invention provides a mounting apparatus for lamp wires of a back light module in which at least two lamp wires extend from a plastic frame. The mounting apparatus comprises a fixed bar portion, a tabling portion, a connecting portion and a retaining clamp portion. The connecting portion connects the fixed bar portion and a tabling portion to form a lamp wire channel therebetween for the first lamp wire to pass through. The connecting portion has a wire-fixing hole to fix the second lamp wire to enter the lamp wire channel. The fixed bar portion, the tabling portion and the connecting portion are mounted in a trench of the plastic frame. The tabling portion and the retaining clamp portion are connected together to extend out from the plastic frame. The retaining clamp portion and the tabling portion have a wire clip hole and a clamp opening connected to the wire clip hole. The wire clip hole is perpendicularly connected to the lamp wire channel to fix the first lamp wire and the second lamp wire. The clamp opening is used to mount the first lamp wire and the second lamp wire to enter the wire clip hole.

During mounting, the second lamp wire is pressed into the wire-fixing hole to enter the lamp wire channel. Then, the whole mounting apparatus is embedded in the corresponding trench in the plastic frame and the second lamp wire is fixed. Then, the second lamp wire detours the clamp opening to fix in the wire clip hole. The first lamp wire is directly embedded into the lamp wire channel. Similarly, the first lamp wire also detours the clamp opening to fix in the wire clip hole. The above mounting method not only is easy but also can avoid breaking the plastic frame during mounting.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The back light module of the present invention is used to provide the light source for the LCD panel. The fluorescent lamps and the back light film are mounted together in the plastic frame of the back light module. The lamp wires of the back light module are derived from the plastic frame to connect with the peripheral power supply circuit. The present invention provides a mounting apparatus for lamp wires of a back light module to mount at least two lamp wires derived from a plastic frame. This mounting structure can reduce the number of bad products resulting from the difficult mounting of the lamp wires.

Figure 1:
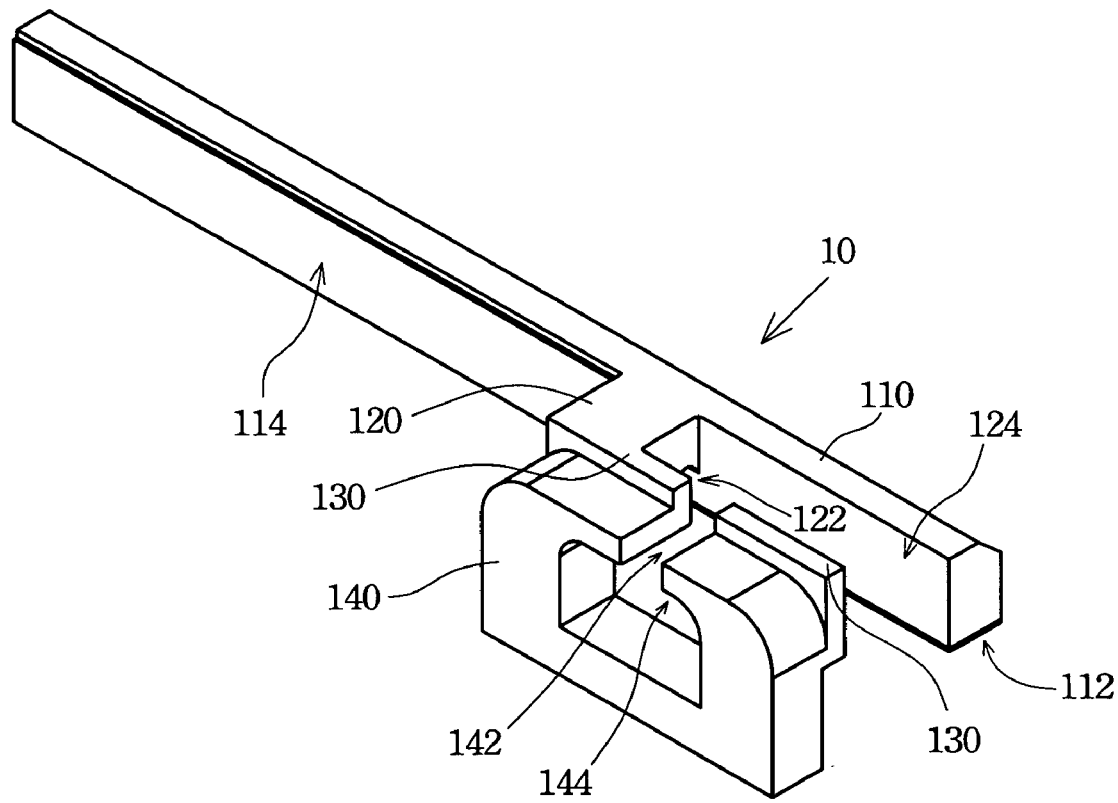
FIG. 1 is a three-dimension schematic of the mounting apparatus according to one preferred embodiment of the present invention.
Figure 2A:
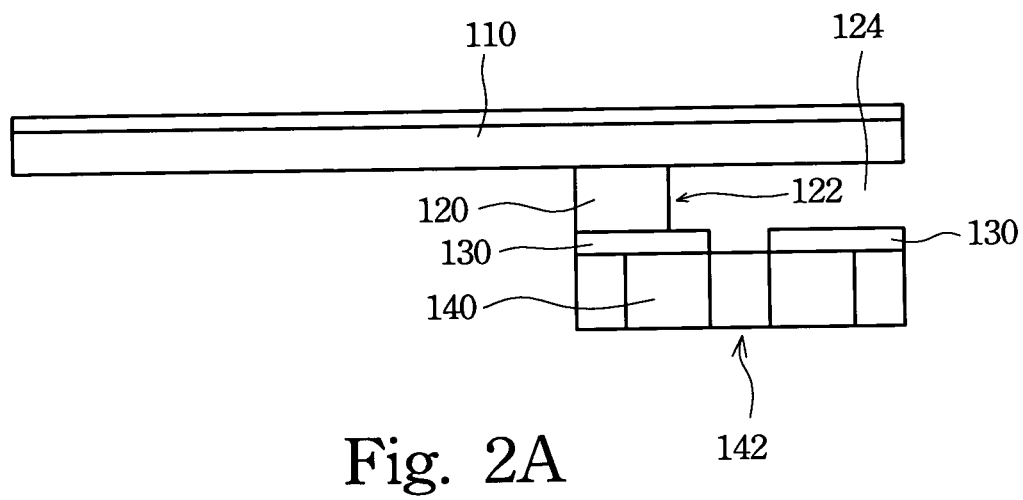
FIG. 2A is a schematic top view of the mounting apparatus according to one preferred embodiment of the present invention.
Figure 2B:
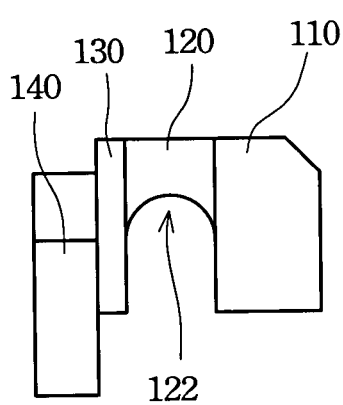
FIG. 2B is a schematic side view of the mounting apparatus according to one preferred embodiment of the present invention.
Figure 2C:
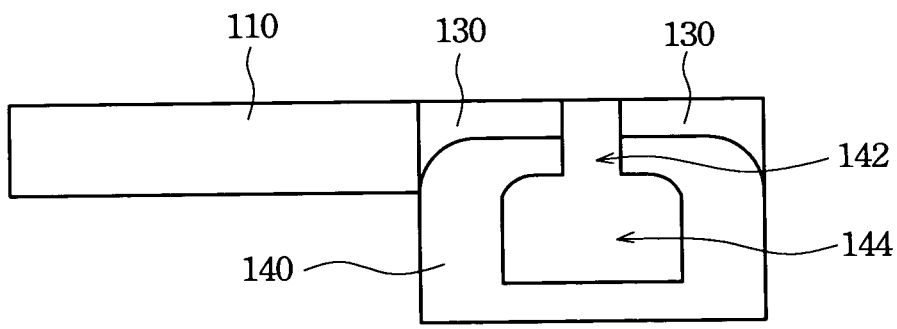
FIG. 2C is a schematic front view of the mounting apparatus according to one preferred embodiment of the present invention.

FIG. 1 is a three-dimension schematic of the mounting apparatus according to one preferred embodiment of the present invention. FIGS. 2A, 2B and 2C respectively illustrate the schematic top view, side view and front view of the mounting apparatus according to one preferred embodiment of the present invention. Referring to FIGS. 1, 2A, 2B and 2C, the mounting apparatus 10 of the present invention comprises a long shape fixed bar portion 110. A connecting portion 120 extends from the middle of the fixed bar portion 110 to connect with one end of a tabling portion 130. The fixed bar portion 110, the connecting portion 120 and the tabling portion 130 form a " ५ " shape structure. The length of the fixed bar portion 110 is larger than the length of the tabling portion 130. The fixed bar portion 110 is divided into two parts, head portion and tail portion, by the connecting portion 120. One side of the tabling portion 130 is connected to the fixed bar portion 110 and the other side is in opposite to the head portion. A lamp wire channel 124 is formed between the fixed bar portion 110 and the tabling portion 130. Those lamp wires derived from the plastic frame of the back light module are conducted to the lamp wire channel. The connecting portion 120 has an arched shape. An arched wire-fixing hole 122 is formed in the bottom of the connecting portion 120 to connect the both sides of the connecting portion 120. The wire-fixing hole 122 can fix the lamp wires passing therethrough to conduct them to the lamp wire channel 124.

The retaining clamp portion 140 is extended from the tabling portion 130. When embedding the back light module, the retaining clamp portion 140 is extended out the plastic frame 20. The retaining clamp portion 140 is like a pair of pliers in appearance. A wire clip hole 144 is formed in the middle of the retaining clamp portion 140 and the tabling portion 130. The wire clip hole 144 is perpendicular and connected to the lamp wire channel 124. The wire clip hole 144 can fix and conduct the lamp wires out from the lamp wire channel 124 to connect with the peripheral circuit. A clamp opening 142 is located in the top of the wire clip hole 144 and connects to the wire clip hole 144. The width of the clamp opening 142 is less than the diameter of the lamp wire. When mounting the lamp wires, the lamp wires can be pressed into the wire clip hole 144 to be fixed in the clamp opening 142. The size of the wire clip hole 144 is related to the required number of the lamp wires. The best size absolutely fixes the lamp wires passing therethrough.

Figure 3:
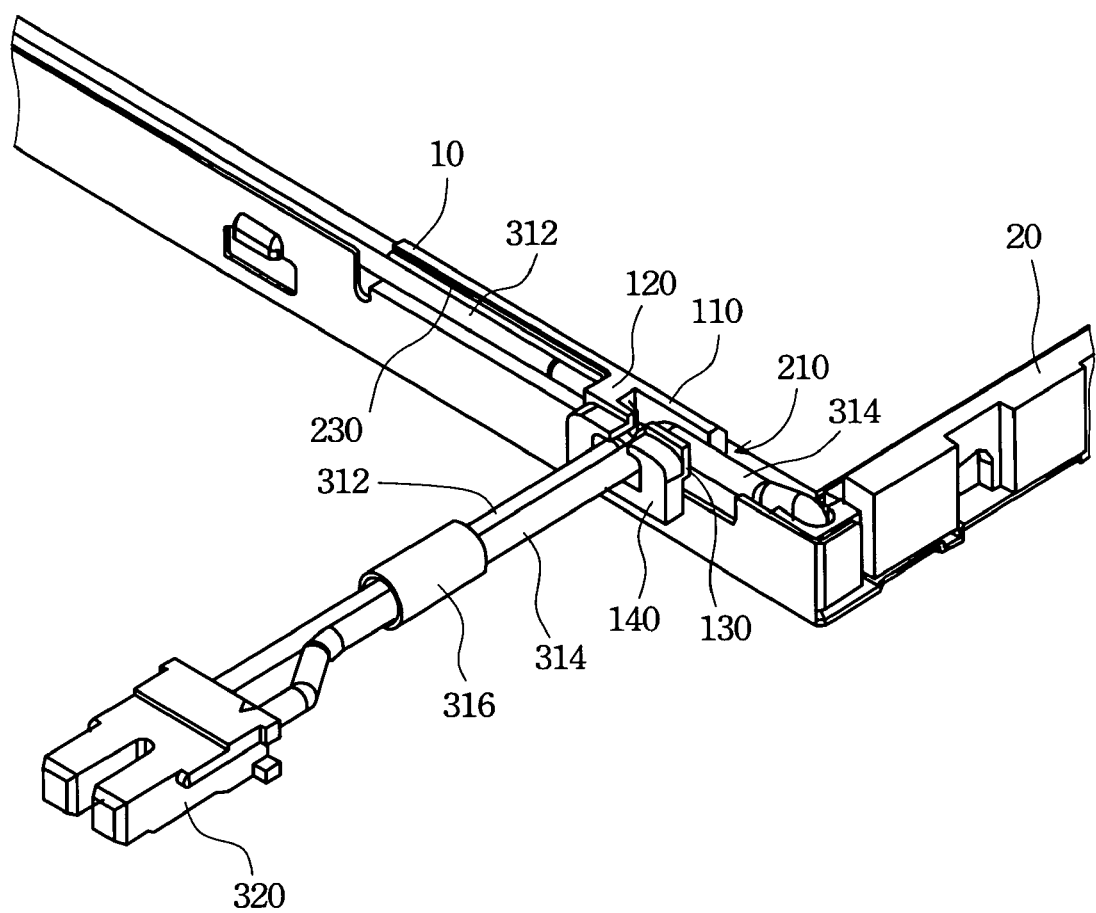
FIG. 3 is a schematic top view of the mounting apparatus embedded in a back light module according to one preferred embodiment of the present invention.

FIG. 3 is a schematic top view of the mounting apparatus embedded in a back light module according to one preferred embodiment of the present invention. At least two lamp wires extend from the plastic frame 20, including a high voltage lamp wire 314 and a low voltage lamp wire 312. The two lamp wires 312 and 314 are connected to an electrical coupling device 320 for coupling to the peripheral circuit. A sleeve is used to fix the two lamp wires 312 and 314. A trench 210 in the plastic frame 20 is used to embed the mounting apparatus 10.

When mounting lamp wires, first the low voltage lamp wire 312 is pressed into the wire-fixing hole 122. Then, the mounting apparatus 10 is embedded into the trench 210 of the plastic frame 20. The low voltage lamp wire 312 can be fixed by the wire-fixing hole 122 of the connecting portion 120. Before embedding the mounting apparatus 10, an adhering matter, such as a twin adhesive, can be used in the side face 114 of the tail portion of the fixed bar portion 110 to adhere the tail portion to the adjacent cover plate 230 of the plastic frame 20. Similarly, the bottom part 112 of the fixed bar portion 110 can be adhered to the plastic frame 20 or the reflective cover of the lamps through an adhering matter, such as a twin adhesive. The low voltage lamp wire 312 can enter the lamp wire channel 124 through the wire-fixing hole 122. The high voltage lamp wire 314 also directly enters the lamp wire channel 124. These two lamp wires 312 and 314 are pressed into the wire clip hole 144 through the clamp opening. The two lamp wires 312 and 314 can be tightly fixed in the plastic frame 20 resulting from the wire clip hole 144. This mounting method not only is easy but also can avoid the plastic frame being broken as a result of pulling and dragging the lamp wires.

According to above descriptions, the present invention provides a mounting structure for lamp wires of a back light module. This structure can fix the lamp wires extending from the plastic frame. Therefore, the lamp wires are orderly. Additionally, operators may easily mount these lamp wires in a back light module. Therefore, the risk of the plastic frame being broken as a result of pulling and dragging the lamp wires while fixing these lamp wires is reduced.

As is understood by a person skilled in the art, the foregoing preferred embodiments of the present invention are illustrative of the present invention rather than limiting of the present invention. It is intended that this description cover various modifications and similar arrangements included within the spirit and scope of the appended claims, the scope of which should be accorded the broadest interpretation so as to encompass all such modifications and similar structure.

What is claimed is:

1. A mounting structure for lamp wires of a back light module to mount at least two lamp wires extending from a plastic frame, said structure comprising:
    a fixed bar portion;
    a tabling portion;
    a connecting portion for connecting said fixed bar portion and said tabling portion, a lamp wire channel for conducting a first lamp wire formed between said fixed bar portion and said tabling portion, and a second lamp wire passing through a wire-fixing hole located in said connecting portion to enter said lamp wire channel, wherein said connecting portion, said fixed bar portion and said tabling portion are embedded into a trench of said plastic frame; and
    a retaining clamp portion connecting with said tabling portion and extending out from said plastic frame, said retaining clamp portion and said tabling portion have a wire clip hole and a clamp opening connected with said wire clip hole, wherein said wire clip hole is perpendicular and connected to said lamp wire channel to fix said first and second lamp wires and said clamp opening is used to mount said first and second lamp wires in said wire clip hole.

2. The structure according to claim 1, wherein a length of said fixed bar portion is larger than a length of said tabling portion.

3. The structure according to claim 1, wherein one side of said tabling portion is opposite one side of said fixed bar portion, and another side of said tabling portion is connected with said connecting portion.

4. The structure according to claim 1, wherein said wire fixing hole is an arched wire fixing hole.

5. The structure according to claim 1, wherein said first lamp wire is a high voltage lamp wire and said second lamp wire is a low voltage lamp wire.

6. The structure according to claim 1, wherein said first lamp wire and said second lamp wire are connected to an electrical coupling device.

7. The structure according to claim 1, wherein a width of said clamp opening is less than a width of said first or second lamp wire.

8. The structure according to claim 1, wherein a side face of said fixed bar portion can be adhered to said adjacent plastic frame by an adhering matter.

9. The structure according to claim 8, wherein said adhering matter is a twin adhesive.

* * * * *